United States Patent Office 3,219,259
Patented Nov. 23, 1965

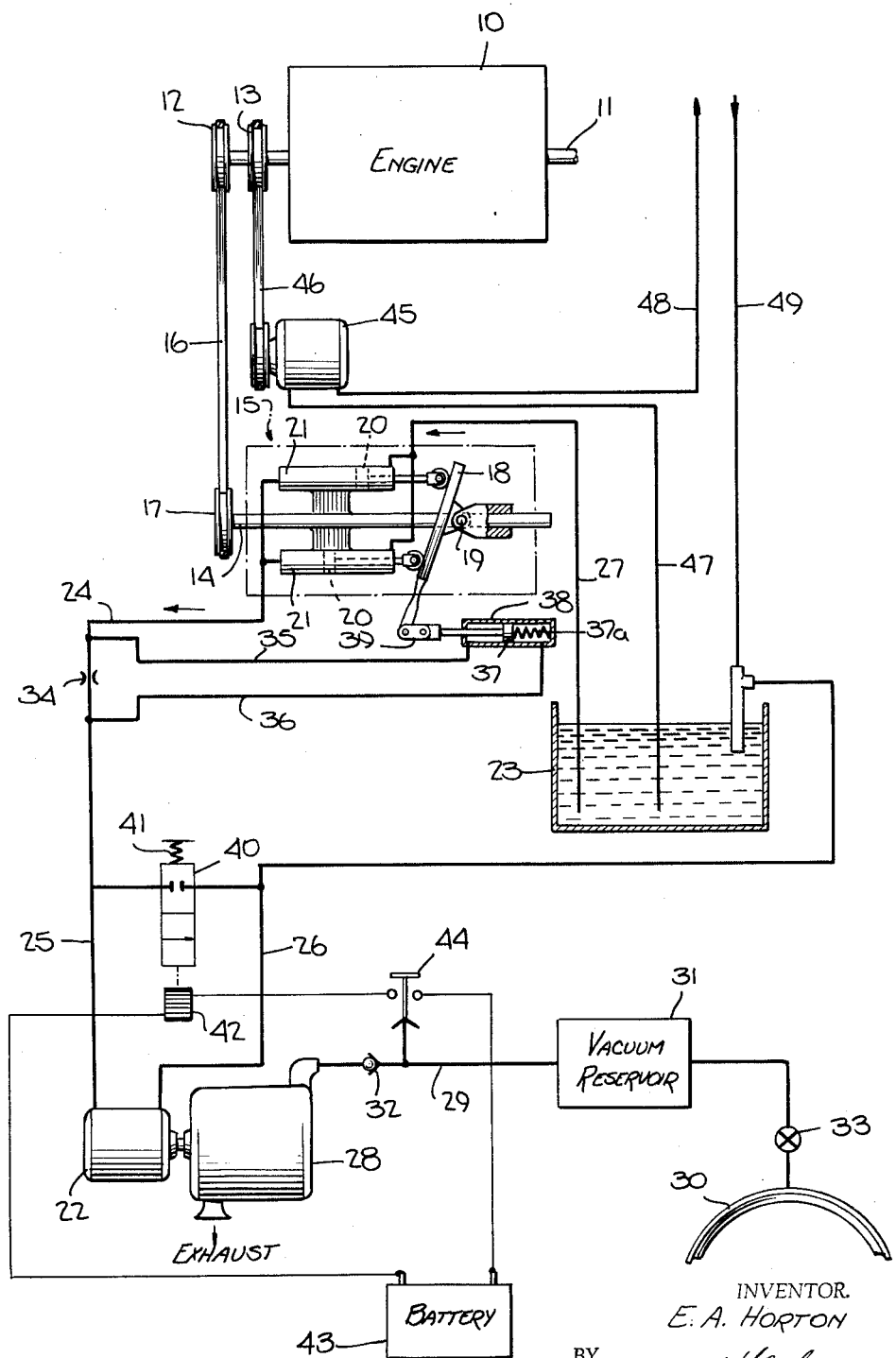

3,219,259
VACUUM SUPPLY SYSTEM FOR INDUSTRIAL TRUCK
Earl A. Horton, Philadelphia, Pa., assignor to Yale & Towne, Inc., New York, N.Y., a corporation of Ohio
Filed Oct. 21, 1963, Ser. No. 317,466
12 Claims. (Cl. 230—11)

This invention relates to a novel vacuum supply system for an industrial truck.

It will be appreciated that industrial trucks often are equipped with vacuum systems for operating a load handling device. When the truck is driven by an internal combustion engine, the system may include a hydraulic power circuit through which the engine drives a vacuum pump. Such systems have certain advantages and have been preferred by the designers of industrial trucks in many cases. However, the earlier systems of this type are quite inefficient and give rise to problems of control, while generating considerable amounts of unwanted heat. Until the present time, no one has been able to design a system that is fully satisfactory, insofar as I am aware. I have now conceived by my invention an extremely novel hydraulic vacuum supply system that will operate in a very satisfactory manner and with much better power efficiency.

In my novel system, the engine of an industrial truck will drive a hydraulic pump of the variable displacement type while the displacement is automatically controlled so as to maintain the fluid output of the pump at a predetermined rate of flow. Together with the variable displacement hydraulic pump, my system includes a relief valve through which the pump output may move with substantially no back pressure, so that the output while flowing at its predetermined rate may move at very low pressure through a circuit. Alternately, the relief valve may move to stop the low pressure flow, so that the pump will develop pressure which will be effective through a hydraulic motor to drive a vacuum pump.

The novel system of my invention will enable the engine of an industrial truck to operate a vacuum pump without substantial losses of power, while achieving the desired speed and power regulation of the vacuum pump. Thus, despite variations in the engine speed, the hydraulic pump of my system will require merely that amount of power which is necessary to drive the vacuum pump at an effective speed when there is a vacuum demand. When there is no demand, the hydraulic pump will continue its fluid output while placing practically no load on the truck engine.

It is an important feature that my system will dissipate minimum amounts of energy in the form of heat, and the fluid in fact may cool as it is circulated by the hydraulic pump.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawing, I show diagrammatically the novel vacuum supply system of my invention. I indicate by the numeral 10 an internal combustion engine that may form the source of power for an industrial truck, the engine 10 having an output shaft 11 that may act through suitable means to drive the traction wheels of the truck, not shown. The engine 10 also has one or more power take-off wheels 12, 13, the wheel 12 being utilized in my invention to drive the shaft 14 of a variable displacement hydraulic pump 15, as through a belt 16 engaging a wheel 17 on pump shaft 14.

The variable displacement pump 15 may have a standard construction, and merely for the purposes of disclosure I indicate a usual type of control plate 18 that can be tilted on a pivot 19 to control the displacement of the pump. As will be understood by those skilled in the art, pistons 20 will be actuated through contact with control plate 18 so as to move in cylinders 21 as the pump shaft 14 rotates, the amount of piston movement depending upon the angle of the control plate. Thus, the control plate 18 when steeply inclined will cause the pump pistons 20 to move through a relatively long stroke in their cylinders 21, effecting a large fluid displacement. As control plate 18 tilts toward vertical position, the piston stroke and displacement will gradually decrease until plate 18 is vertical, at which time pistons 20 no longer will stroke and the pump displacement will be zero. At this point I shall indicate that the pump 15 utilized in my invention will have a maximum displacement that is sufficient to produce a predetermined effective rate of output flow while the engine 10 operates at idling speed. I believe that it will be unnecessary to describe further details of the hydraulic pump 15, since those details are not important to an understanding of my invention.

In my novel system, the variable displacement pump 15 forms a part of a hydraulic power circuit including a hydraulic motor 22 and a reservoir tank 23. The fluid output of pump 15 will move through pressure lines 24, 25, toward motor 22, and then from the motor 22 through line 26 to the reservoir tank 23. A line 27 serves as an intake through which hydraulic pump 15 will be supplied with fluid from the tank 23.

The hydraulic motor 22 will be utilized for driving a vacuum pump 28 which will act through a line 29 for exhausting air from a load handling device such as a vacuum pad 30. As shown, a vacuum reservoir 31 is interposed in the line 29, and there is a check valve 32 for preventing a loss of vacuum from reservoir 31 through vacuum pump 28 when the pump is not in operation. A control valve 33 may be utilized by the operator of the truck for controlling the operation of the vacuum pad 30.

Referring again to the hydraulic circuit, I show an orifice 34 interposed between the lines 24, 25. Orifice 34 is of a size that will not substantially restrict the fluid flow through lines 24, 25, and that will merely effect a slight pressure reduction between those lines when the variable displacement pump 15 is in operation. Thereby the lines 24, 25 will have a slight pressure differential that will increase as the rate of fluid flow through lines 24, 25 may tend to increase. The fluid pressure in lines 24, 25 will act through lines 35, 36 against opposed ends of a plunger 37 in a cylinder 38, the higher pressure being present in line 35 and tending to move plunger 37 toward the right, as viewed in the drawing. A spring 37a presses plunger 37 toward the left, in effect balancing the plunger while yielding to allow the pressure differential to control the position of plunger 37 in cylinder 38.

Should the fluid pressure differential increase, due to a tendency of the pump output to increase beyond a predetermined rate of flow, plunger 37 will move toward the right and will act through a link 39 to move control plate 18 somewhat toward a neutral vertical position.

That will reduce the pump displacement sufficiently to return the pump output to its predetermined rate. Thus, once the engine 10 reaches idling speed, the variable displacement pump 15 will maintain substantially at a predetermined rate the volume of fluid flow through the pressure lines 24, 25, despite the fact that the engine 10 will be accelerated during the operation of the truck and may at times drive pump 15 at a very high speed.

I now call attention to the fact that I arrange a relief valve 40 in bypassing relation to the hydraulic motor 22 in the fluid circuit. A spring 41 normally holds relief valve 40 in a closed position, causing the flow of fluid in line 25 to apply the pressure that is necessary to drive the motor 22 and vacuum pump 28. Since the fluid flows to motor 22 at a predetermined rate, the vacuum pump 28 may operate at a particular speed that is most efficient, despite variation in the speed of the internal combustion engine 10.

A solenoid 42 is connected to relief valve 40, and when energized will move valve 40 to an open position in which the fluid flowing in pressure line 25 will be discharged freely and with practically no back pressure, the flow then moving through line 26 to the reservoir 23. The solenoid 42 will be energized through a battery 43 and a vacuum switch 44, that switch being connected to the vacuum line 29 so as to be responsive to a predetermined degree of vacuum in the reservoir 31.

When the vacuum reservoir 31 is fully charged, the vacuum switch 44 will cause relief valve 40 to discharge the full output flow of the hydraulic pump 15 through the valve 40 to the fluid reservoir tank 23. Thus, when the demand on vacuum pump 28 is satisfied, valve 40 will substantially remove the fluid pressure from the pressure line 25 so that the hydraulic motor 22 no longer will operate the vacuum pump 28. The slight differential pressure at the orifice 34 will be maintained so that the hydraulic pump 15 will continue to move the fluid at its predetermined rate of flow through the hydraulic circuit. Also, the flow then will be at extremely low pressure in all parts of the circuit and will generate minimum amounts of heat, while actually tending to cool by its movement through the reservoir tank 23. Moreover, the hydraulic pump 15 will then be operating with practically no load, placing very little load on the internal combustion engine 10.

As will be understood, the vacuum switch 44 will effect a movement of relief valve 40 to closed position when the degree of vacuum drops in the reservoir 31, enabling the fluid pressure in the line 25 to rise so as to drive the hydraulic motor 22. Since the fluid will continue to flow at its predetermined rate, the hydraulic motor 22 again will operate the vacuum pump 28 at a particularly speed.

Those skilled in the art will appreciate that the operation of the industrial truck may require the internal combustion engine to operate at speeds that vary through a wide range, while at times the engine may merely idle. Nevertheless, my novel system will enable the engine 10 to operate with a minimum loss of power while achieving very effective speed and power regulation of the vacuum pump 28. Actually, it is possible through my invention to utilize the engine of an industrial truck to drive a vacuum pump at the most effective speed of the pump, and to operate that pump as the vacuum demand may require. All of these things will be achieved while dissipating minimum amounts of energy in the form of heat.

As is frequently the case on industrial trucks, the internal combustion engine 10 may be utilized to operate further devices. Thus, for example, there may be a hydraulic pump that I show at 45, which may be driven by the engine 10 through the power takeoff wheel 13 and a belt 46. The pump 45 may draw fluid through an intake line 47 from reservoir tank 23, there being further lines 48, 49 to complete a fluid circuit between pump 45, tank 23, and a hydraulically operated device which is not shown. Regardless of the speeds at which the internal combustion engine 10 may need to operate in order to drive the truck or particular devices on the truck, my novel system will enable the engine 10 to act very efficiently through a hydraulic circuit to generate vacuum on the truck.

I believe that the operation and the advantages of my novel vacuum generating system will now be understood, and that the very considerable merits of my invention will be fully appreciated by those persons who are skilled in the art.

I now claim:

1. In an industrial truck of the class described, a vacuum pump, a hydraulic motor for driving said vacuum pump whereby to supply vacuum for operating a load handling device, an engine acting as a source of power, a variable displacement hydraulic pump driven by said engine to supply fluid pressure for operating said hydraulic motor, and control means responsive to the operation of the hydraulic pump to control the pump displacement so as to maintain substantially at a predetermined rate the output flow of the hydraulic pump, whereby to minimize power losses due to changes in the speed of said engine while effecting operation of the vacuum pump at a particular speed.

2. In an industrial truck of the class described, a vacuum pump, a hydraulic motor for driving said vacuum pump whereby to supply vacuum for operating a load handling device, an engine acting as a source of power, a variable displacement hydraulic pump driven by said engine to supply fluid pressure for operating the hydraulic motor, and control means actuated by the output flow of the hydraulic pump to control the pump displacement so as to maintain the flow substantially at a predetermined rate while the hydraulic pump is in operation, whereby to minimize power losses due to changes in the speed of said engine while effecting operation of the vacuum pump at a particular speed.

3. In an industrial truck of the class described, a vacuum pump, a hydraulic motor for driving said vacuum pump whereby to supply vacuum for operating a load handling device, an engine acting as a source of power, a variable displacement hydraulic pump driven by said engine to supply fluid pressure for operating the hydraulic motor, an orifice through which the fluid output of said hydraulic pump flows so as to effect a fluid control pressure, and means applying the fluid control pressure to control the pump displacement so as to maintain substantially at a predetermined rate the output flow of the hydraulic pump, whereby to operate the vacuum pump at a particular speed while minimizing power losses due to changes in the speed of said engine.

4. In an industrial truck of the class described, a vacuum pump, a hydraulic motor for driving said vacuum pump whereby to supply vacuum for operating a load handling device, an engine acting as a source of power, a variable displacement hydraulic pump driven by said engine, means directing the fluid pressure output of said hydraulic pump toward the hydraulic motor for operating said motor, means for diverting the fluid pressure output of the hydraulic pump so that the fluid does not operate said hydraulic motor, and control means responsive to the operation of said hydraulic pump to control the pump displacement so as to maintain the pump output substantially at a predetermined rate of flow, whereby to minimize power losses while achieving speed regulation of the vacuum pump and also while the motor does not drive the vacuum pump.

5. In an industrial truck of the class described, a vacuum pump, a hydraulic motor for driving said vacuum pump whereby to supply vacuum for operating a load handling device, an engine acting as source of power, a hydraulic pump driven by said engine whereby to supply fluid pressure for operating said hydraulic motor, a relief valve connected to the hydraulic pump output, and means for actuating said relief valve to a position substantially diverting the fluid pressure of the pump output, enabling said pump to move the fluid at a minimum pressure and with substantially no loss of power when the vacuum pump does not need to operate.

6. In an industrial truck of the class described, an engine operating at varying speeds while acting as a source of power, a variable displacement hydraulic pump driven by said engine, a vacuum pump for developing vacuum to operate a load handling device, a pressure line through which the fluid pressure output of the hydraulic pump is applied to a hydraulic motor for driving the vacuum pump, a relief valve connected to said pressure line and effective when actuated to divert the output flow of the hydraulic pump, means responsive to the vacuum generated by the vacuum pump to actuate said relief valve so as to remove substantially the fluid pressure acting in said pressure line, the removal of pressure enabling said engine to operate with a minimum load due to the hydraulic pump while the vacuum pump does not operate, and means automatically varying the displacement of said hydraulic pump so as to maintain substantially at a predetermined rate the flow of fluid in the pressure line, whereby to develop minimum amounts of heat in the hydraulic fluid while effecting speed regulation and control of the operation of the vacuum pump.

7. In a vacuum generating system for an industrial truck of the class described an engine operating at varying speed while acting as a source of power, a variable displacement hydraulic pump driven by said engine, a hydraulic circuit including a hydraulic motor and a reservoir tank through which fluid is moved by said pump, means responsive to the operation of said hydraulic pump by the engine to vary the displacement of the hydraulic pump so as to maintain substantially at a predetermined rate the flow of fluid in said circuit, a vacuum pump connected to said hydraulic motor so as to be driven by the fluid flowing in the circuit, and said variable displacement hydraulic pump acting with minimum power losses to effect speed and power regulation of the vacuum pump.

8. In a vacuum generating system for an industrial truck of the class described, an engine operating at varying speeds while acting as a source of power, a variable displacement hydraulic pump driven by said engine, a hydraulic circuit including a hydraulic motor and a reservoir tank through which the fluid pump output flows, a vacuum pump driven by said hydraulic motor, an orifice through which the fluid flows in said circuit to effect a fluid control pressure, and means applying said control pressure to control the displacement of the hydraulic pump so as to maintain substantially at a predetermined rate the flow of fluid in said circuit, whereby to eliminate excessive fluid pressures while effecting speed and power regulation of the vacuum pump.

9. In a vacuum generating system for an industrial truck of the class described, an engine operating at varying speeds while acting as a source of power, a variable displacement hydraulic pump driven by said engine, a hydraulic circuit including said variable displacement pump, a hydraulic motor and a reservoir tank, means responsive to the fluid pressure output of the hydraulic pump to vary the displacement of the hydraulic pump so as to maintain substantially at a predetermined rate a flow of fluid in said circuit, a vacuum pump connected to said hydraulic motor, a relief valve connected in bypassing relation to the hydraulic motor in the hydraulic circuit, said relief valve normally being closed so that the fluid pressure will act through said motor to drive the vacuum pump at a particular speed, and means responsive to the vacuum developed by the vacuum pump to actuate said relief valve whereby to discharge fluid at said predetermined rate to the reservoir tank, said fluid discharge substantially removing fluid pressure from the hydraulic circuit so as to reduce the load on the engine due to the hydraulic pump while the vacuum pump does not operate, and tending to cool the fluid by its continued movement through the reservoir tank in the hydraulic circuit.

10. In a vacuum generating system for an industrial truck of the class described, an engine operating at varying speeds while acting as a source of power, a vacuum pump for developing vacuum to operate a load handling device, a variable displacement hydraulic pump driven by said engine, a hydraulic circuit including said variable displacement pump, a hydraulic motor that drives the vacuum pump, and a reservoir tank, an orifice through which the fluid pressure output of the hydraulic pump flows in said circuit whereby to effect a fluid control pressure, means applying said control pressure to control the displacement of the hydraulic pump so as to maintain substantially at a predetermined rate the flow of fluid in said circuit, a relief valve effective when actuated to bypass said predetermined flow in relation to the hydraulic motor in the hydraulic circuit, said relief valve normally being closed so that the fluid flow will be effective to drive the vacuum pump at a particular speed, and means responsive to the vacuum developed by the vacuum pump to actuate said relief valve so as to remove substantially the fluid pressure acting in the hydraulic circuit, enabling said engine to operate with minimum power losses due to regulation and control of the vacuum pump while also tending to cool the fluid by its continued movement in the circuit through the reservoir tank.

11. In an industrial truck of the class described having an engine that acts as a source of power, a variable displacement hydraulic pump driven by the truck engine, a vacuum pump, means directly connecting the fluid pressure output of the variable displacement hydraulic pump to a hydraulic motor for driving the vacuum pump, and a differential pressure device actuated with very little pressure loss by the output of the hydraulic pump to control the pump displacement, whereby to control the volume of said output and therefore the speed of the vacuum pump at all speeds at which said engine drives said hydraulic pump.

12. In an industrial truck of the class described having an engine that acts as a source of power, a variable displacement hydraulic pump driven by said engine, said pump effecting a maximum fluid flow output when the engine operates at an idling speed, a vacuum pump, means directly connecting the hydraulic pump output to a hydraulic motor for driving said vacuum pump, and a differential pressure device actuated with very little pressure loss by the output flow of the hydraulic pump to control the pump displacement, so as to control the volume of said flow and therefore the speed of the vacuum pump while said engine operates faster than idling speed.

References Cited by the Examiner
UNITED STATES PATENTS

| | | | |
|---|---|---|---|
| 2,440,614 | 4/1948 | Postel | 230—11 |
| 3,093,297 | 6/1963 | Weisenbach | 230—11 |

LAURENCE V. EFNER, *Primary Examiner.*